No. 11,963. Reissued Jan. 28, 1902.

M. BARTLEY.

NUT LOCK.

(Application filed Dec. 4, 1901.)

2 Sheets—Sheet 1.

Witnesses:

E. V. Mackenzie

Chas. S. Lepley

Inventor:

Milton Bartley by C. M. Clarke his Attorney

THE NORRIS PETERS CO., WASHINGTON, D. C.

No. 11,963. Reissued Jan. 28, 1902.

M. BARTLEY.

NUT LOCK.

(Application filed Dec. 4, 1901.)

2 Sheets—Sheet 2.

*Witnesses:*

E. V. Mackenzie

Chas. S. Lepley

*Inventor:*

Milton Bartley by T. M. Clarke his attorney

THE NORRIS PETERS CO., WASHINGTON, D. C.

UNITED STATES PATENT OFFICE.

MILTON BARTLEY, OF POLK, PENNSYLVANIA, ASSIGNOR OF THREE-TENTHS TO JAMES MOORHEAD MURDOCH AND HARRY FLEMING McDOWELL, OF PITTSBURG, PENNSYLVANIA, AND GEORGE LINCOLN WEAVER, OF PHILADELPHIA, PENNSYLVANIA.

NUT-LOCK.

SPECIFICATION forming part of Reissued Letters Patent No. 11,963, dated January 28, 1902.

Original No. 656,152, dated August 14, 1900. Application for reissue filed December 4, 1901. Serial No. 84,709.

*To all whom it may concern:*

Be it known that I, MILTON BARTLEY, a citizen of the United States, residing at Polk, in the county of Venango and State of Pennsylvania, have invented certain new and useful Improvements in Nut-Locks, of which the following is a specification, reference being had therein to the accompanying drawings, forming part of this specification, in which—

Figure 2:
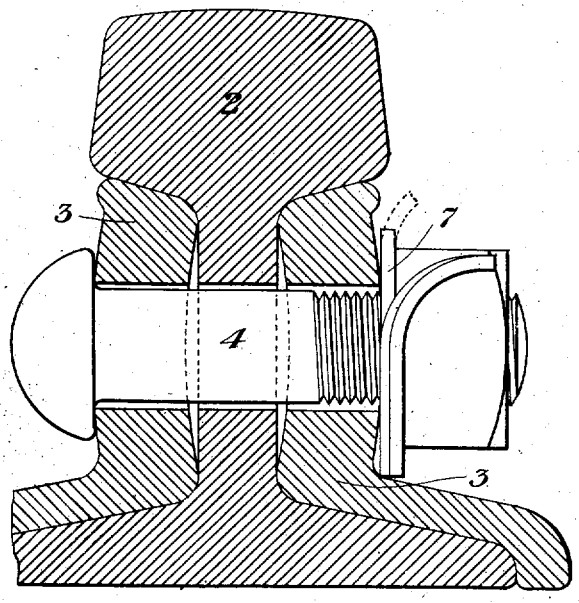
Figure 1:
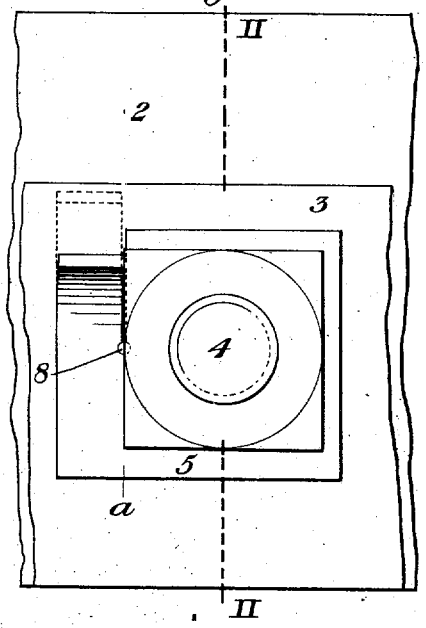
Figure 3:
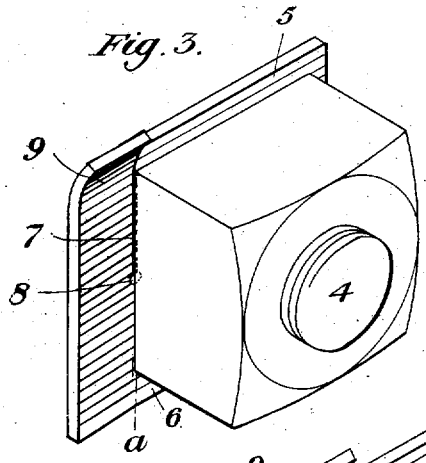
Figure 4:
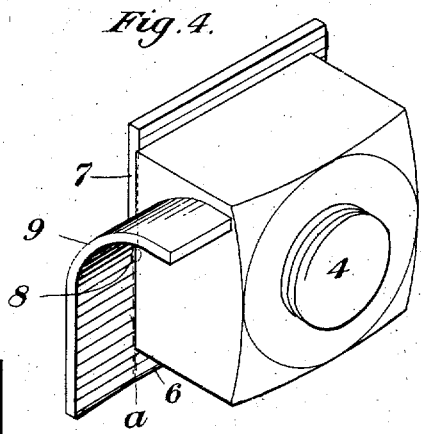
Figure 5:
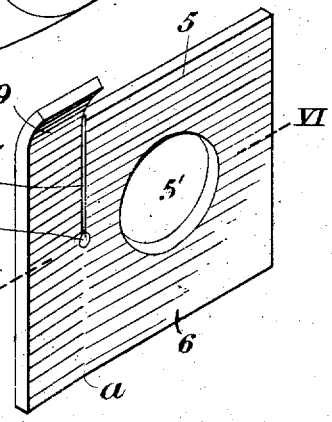
Figure 6:
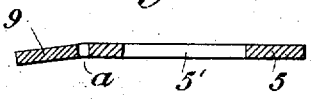
Figure 7:
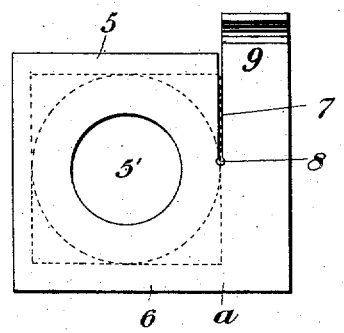
Figure 8:
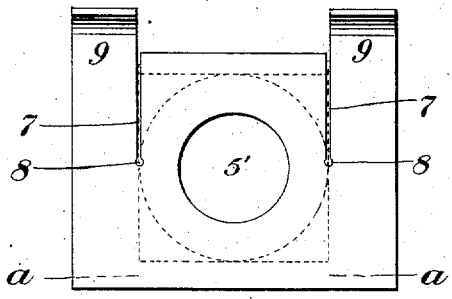

Figure 1 is a face view of a portion of a rail-joint, showing the application of my improved nut-lock. Fig. 2 is a cross-sectional view on the line 11 11 of Fig. 1. Fig. 3 is a perspective view showing the locking-washer in position under the nut. Fig. 4 is a similar view showing the locking-tongue turned down to engage the side of the nut. Fig. 5 is a perspective detail view of the washer. Fig. 6 is a sectional view taken on the line VI VI of Fig. 5. Fig. 7 is a face view of the washer provided with a tongue at the right side for use with a left-hand-threaded nut. Fig. 8 is a similar view showing the washer provided with a tongue at both sides.

My invention consists of an improvement in devices for preventing nuts from loosening by turning; and it consists in a specially-constructed washer-plate adapted to engage the bolt under the nut and provided with a partially-severed outwardly-bent tongue, capable of being bent down alongside the nut in engagement with its side, made and used as I shall now proceed to describe.

Referring to the drawings, I have shown my invention applied to a rail-joint, wherein 2 represents the rail, the ends of which are connected by the usual fish-plate 3 3 and bolt 4.

My improved locking-washer is made of a metallic plate 5, preferably pliable, having a central hole 5′ for the bolt and along one side a straight edge 6, adapted to bear against the flange of the fish-plate or of the rail, as the case may be, so as to prevent turning of the washer-plate. On a line to one side of the central hole 5′ and corresponding in relative location to the side of the nut the plate is cut down, as at 7, to about the level of the center of the bolt-hole, which cut may terminate, if desired, in a round hole 8, so as to prevent any tendency to rip or split the metal when the tongue is bent down. This divided portion of the washer-plate constitutes a tongue 9, which may extend, if desired, slightly above the main body portion of the washer-plate or for a sufficient distance above the termination of the cut 7 to provide enough stock to give a good bearing against the nut. This tongue is curved outwardly at the top to facilitate the bending action by insertion of a suitable tool or striking by a hammer, so as to bring it into position with the side of the nut. In order to insure a tight bearing, this tongue portion of the plate is also slightly bent forwardly on a line *a* with the cut 7, so that when the tongue is bent down it will move outwardly in a plane at right angles to its own body portion, and therefore somewhat inwardly toward and against the adjacent side of the nut. This latter feature is an important and valuable one, as the tongue will thus be brought into close contact with the nut and will effectually act to prevent its movement. By turning the tongue back to its original position the nut may be unscrewed and the washer may, if desired, be used again.

When used with a bolt having a left-hand screw, I use the form shown in Fig. 7, wherein the tongue 9 is located at the right side, while in Fig. 8 I have shown a still further modification in which a tongue is provided at each side, so as to admit of its use with either a right or left hand washer, or both tongues may be bent down, if desired, with either style of thread of nut.

It will be understood that I do not desire to be confined to the exact shape as shown, but that variations may be made by the skilled mechanic without departing from my invention as expressed in the following claims.

What I claim is—

1. A nut-lock washer consisting of a plate provided with a bolt-hole and a bearing edge, and a tongue partially severed from the plate on a line corresponding to the edge of the nut, and bent outwardly at an angle to the face of the washer on the line of severance whereby when the tongue is bent down it will bind inwardly against the side of the nut.

2. In a nut-lock, the combination with a bolt and a nut, of a washer-plate engaging the bolt under the nut provided with a bearing edge, a partially-severed tongue bent outwardly on the line of severance, and at an angle to the face of the washer, and adapted to be bent down and to bind inwardly against the side of the nut.

In testimony whereof I affix my signature in the presence of two witnesses.

MILTON BARTLEY.

Witnesses:

EDWIN M. WHITE,

WM. TURNER.